(12) United States Patent
Sundstrom et al.

(10) Patent No.: US 8,570,915 B2
(45) Date of Patent: Oct. 29, 2013

(54) RELAY RADIO FRONT-END

(75) Inventors: Lars Sundstrom, Lund (SE); Christian Hoymann, Aachen (DE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 503 days.

(21) Appl. No.: 12/817,325

(22) Filed: Jun. 17, 2010

(65) Prior Publication Data

US 2011/0243037 A1 Oct. 6, 2011

Related U.S. Application Data

(60) Provisional application No. 61/320,036, filed on Apr. 1, 2010.

(51) Int. Cl.
*H04B 7/14* (2006.01)

(52) U.S. Cl.
USPC .......................................................... 370/279

(58) Field of Classification Search
None
See application file for complete search history.

(56) References Cited

U.S. PATENT DOCUMENTS

| | | | |
|---|---|---|---|
| 7,349,665 B1* | 3/2008 | Zhu et al. | 455/11.1 |
| 2004/0018819 A1* | 1/2004 | Coan | 455/83 |
| 2008/0108317 A1* | 5/2008 | Hsieh et al. | 455/232.1 |
| 2010/0142416 A1* | 6/2010 | Kim | 370/281 |

FOREIGN PATENT DOCUMENTS

| | | |
|---|---|---|
| WO | 2006/099209 A2 | 9/2006 |
| WO | 2009/154352 A2 | 12/2009 |
| WO | 2010/003098 A2 | 2/2010 |

OTHER PUBLICATIONS

International Search Report and Written Opinion mailed Jun. 29, 2011 in corresponding PCT Application No. PCT/SE2011/050200.
R1-101119, "Relay UL/DL timing discussion", 3GPP TSG RAN WG1 Meeting #60, SanFrancisco, USA, Feb. 22-26, 2010.
R1-101751, "On the Feasibility of Single-Transceiver Relay Design", 3GPP TSG-RAN WGI #60bis, Beijing, China, Apr. 12-16, 2010.
R1-084412, "LTE Signalling to Support Relay Operation", 3GPP TSG RAN WG1 Meeting #55, Prague, Czech Republic, Nov. 10-14, 2008.

* cited by examiner

*Primary Examiner* — Minh-Trang Nguyen
(74) *Attorney, Agent, or Firm* — Nixon & Vanderhye, P.C.

(57) ABSTRACT

A relay node (34) which wirelessly communicates on a backhaul link over a first interface with a base station node (28) of a radio access technology network and which wirelessly communicates on an access link over a second interface with a wireless terminal (30). The relay node (34) comprises a transceiver (36) and a duplexer section (40). The transceiver (36) comprises a transmitter (42) and a receiver (44). The duplexer section (40) comprises plural transceiver ports (50, 52) and at least one antenna port (48). The relay node (34) is configured to provide a transmit signal from the transmitter (42) in a manner whereby a backhaul link portion of the transmit signal is conveyed through a different transceiver port (50) of the duplexer section than is an access link portion of the transmit signal.

15 Claims, 7 Drawing Sheets

RELAY RADIO FRONT-END

This application claims the priority and benefit of U.S. Provisional Patent application 61/320,036, filed Apr. 1, 2010, entitled "Relay Radio Front-End", which is incorporated herein by reference in its entirety.

BACKGROUND

The technology disclosed herein pertains to telecommunications, and particularly to structure and operation of a relay node in a cellular telecommunications system.

In a typical cellular radio system, wireless terminals communicate via a radio access network (RAN) to one or more core networks. Wireless terminals are also known as mobile stations and/or user equipment units (UEs). The wireless terminals can be mobile stations or user equipment units (UE) such as mobile telephones, "cellular" telephones, and laptops with wireless capability and/or mobile termination, and thus can be, for example, portable, pocket, hand-held, computer-included, or car-mounted mobile devices which communicate voice and/or data via the radio access network.

The radio access network (RAN) covers a geographical area which is divided into cell areas, with each cell area being served by a base station, e.g., a radio base station (RBS), which in some networks is also called "NodeB" or "B node". A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, particularly earlier versions, several base stations are typically connected to a radio network controller (RNC). The connection can be by landlines or microwave. The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network using wideband code division multiple access for user equipment units (UEs). The Third Generation Partnership Project (3GPP) has undertaken to evolve further the UTRAN and GSM based radio access network technologies.

Long Term Evolution (LTE) is a variant of a 3GPP radio access technology wherein the radio base station nodes are connected directly to a core network rather than to radio network controller (RNC) nodes. In general, in LTE the functions of a radio network controller (RNC) node are performed by the radio base station nodes. As such, the radio access network (RAN) of an LTE system has an essentially "flat" architecture comprising radio base station nodes that do not report to radio network controller (RNC) nodes.

Relays have been identified as an important complement to boost system capacity of cellular communication systems based on standards like 3GPP LTE. A relay can be thought of as an enhanced repeater, where the cell coverage and also possibly cell-edge throughput can be extended/improved. A new interface, Un interface, exists between the traditional eNodeB and a relay node. An example of relaying in LTE-Advanced, also known as 3GPP Release 10, is Layer 3 relaying with self backhauling.

Various scenarios can be devised including everything from large outdoor relays operating very much like full-fledged base-stations serving large areas and many users to very small indoor relays for home or office use supporting very limited area and a few users. With a denser deployment of the latter the cost of relays has to be correspondingly lower till the point that the choice of radio architecture starts to have a major impact on total cost.

A simplified radio architecture may require the definition of new relay classes and associated functional and performance requirements in the standard. One such contribution is described in R1-101119, "Relay UL/DL timing discussion", 3GPP TSG RAN WG1 Meeting #60, San Francisco, USA, 22-26 Feb. 2010, incorporated herein by reference in its entirety, where the aim is to reduce the number of transceivers by allowing transmission in one direction at a time, either on the Un link (UL frequency) or on the Uu link (DL frequency). Correspondingly, at any given point time reception is only allowed either on the Un link (DL frequency) or on the Uu link (UL frequency).

SUMMARY

In one of its aspects the technology disclosed herein concerns a relay node which wirelessly communicates on a backhaul link over a first interface with a base station node of a radio access technology network and which wirelessly communicates on an access link over a second interface with a wireless terminal. The relay node comprises a transceiver and a duplexer section. The transceiver comprises a transmitter and a receiver. The duplexer section comprises plural transceiver ports and at least one antenna port. The relay node is configured to provide a transmit signal from the transmitter in a manner whereby a backhaul link portion of the transmit signal is conveyed through a different transceiver port of the duplexer section than is an access link portion of the transmit signal.

In some example embodiments the transceiver is connected to the duplexer section so that the backhaul link portion of the transmit signal and the access link portion of the transmit signal are alternatingly applied to the different transceiver ports of the duplexer section for respective alternating transmission on the first interface and the second interface.

In some example embodiments the duplexer section is configured so that a transmit signal applied to transceiver ports of the duplexer section, but in alternating fashion a first of the transceiver ports conveys the backhaul link portion of the transmit signal and a second of the transceiver ports conveys the access link portion of the transmit signal, so that the portions of the transmit signal are alternatingly transmitted on the first interface and the second interface.

In an example embodiment the front end of the relay node further comprises a set of switches through which the transmitter and the receiver swap transceiver ports to the duplexer section. In an example implementation, the duplexer section comprises a sole duplexer. Transceiver ports of the sole duplexer comprise a sole uplink (UL) port and a sole downlink (DL) port. The relay node further comprises a set of switches through which the transmitter and the receiver are selectively connected to the transceiver ports of the duplexer section. In an example implementation, the uplink (UL) port and the downlink (DL) port of the relay node have a same power handling capability.

In an example implementation, the set of switches comprises a first pair of switches connected to the sole uplink (UL) port of the sole duplexer and a second pair of switches connected to the sole downlink (DL) port of the sole duplexer. A first switch of the first pair is also selectively connected to the transmitter; a second switch of the first pair is also selectively connected to the receiver; a first switch of the second pair is also selectively connected to the transmitter; and a second switch of the second pair is also selectively connected to the receiver.

In an example implementation, the first switch of the first pair is open when the transmitter transmits on the second interface and the receiver receives on the second interface but is closed when the transmitter transmits on the first interface and the receiver receives on the first interface. The second switch of the first pair is closed when the transmitter transmits on the second interface and the receiver receives on the second interface but is open when the transmitter transmits on the first interface and the receiver receives on the first interface. The first switch of the second pair is closed when the transmitter transmits on the second interface and the receiver receives on the second interface, but is open when the transmitter transmits on the first interface and the receiver receives on the first interface. The second switch of the second pair is open when the transmitter transmits on the second interface and the receiver receives on the second interface, but is closed when the transmitter transmits on the first interface and the receiver receives on the first interface.

In an example embodiment, the relay node further comprises means, e.g., such as a controller, for selectively operating plural switches of the set of switches.

In an example embodiment, the relay node further comprises a sole antenna and an antenna port switch. The duplexer section comprises a backhaul link duplexer and an access link duplexer. The transmitter is connected to apply a transmit signal to both a transmit port of the backhaul link duplexer and a transmit port of the access link duplexer and the receiver is connected to both a receive port of the backhaul link duplexer and a receive port of the access link duplexer. The backhaul link duplexer and the access link duplexer are configured to convey a signal only if the signal is appropriate, e.g., frequency appropriate, to the respective link. An antenna port of the backhaul link duplexer and an antenna port of the access link duplexer are selectively connected to the sole antenna of the relay node through the antenna port switch.

In an example embodiment the relay node further comprises a backhaul link antenna; an access link antenna; and a set of switches connected between the duplexer section and the transceiver. The duplexer section comprises a backhaul link duplexer and an access link duplexer. The set of switches comprises a transmitter switch and a receiver switch. The transmitter switch is selectively connected to a transmit port of the backhaul link duplexer and to a transmit port of the access link duplexer. The receiver switch is selectively connected to a receive port of the backhaul link duplexer and to a receive port of the access link duplexer.

In an example embodiment, the relay node further comprises a backhaul link antenna and an access link antenna. The duplexer section comprises a backhaul link duplexer and an access link duplexer. The transmitter is connected to apply a transmit signal to both a transmit port of the backhaul link duplexer and a transmit port of the access link duplexer. The receiver is connected to both a receive port of the backhaul link duplexer and a receive port of the access link duplexer. The backhaul link duplexer and the access link duplexer are configured to convey a signal only if the signal is frequency appropriate to the respective link.

In an example embodiment, the relay node further comprises a modulator connected to the transmitter; a demodulator connected to the receiver; and a frame processor. The frame processor is configured to generate frames to be transmitted over the first interface and the second interface from the relay node and to process frames received by the relay node over the first interface and the second interface.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
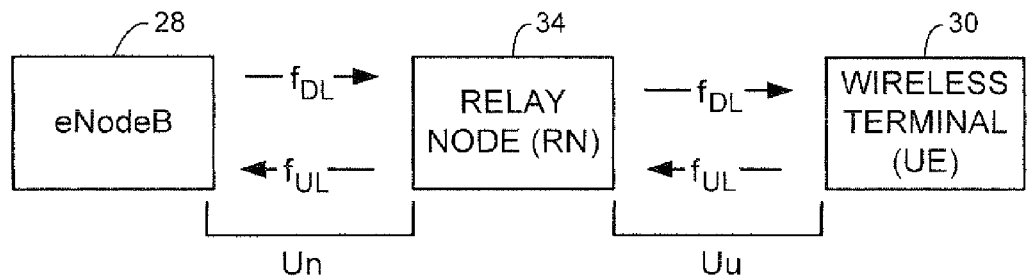
FIG. 1 is a diagrammatic view of portions of an example cellular telecommunications radio access network (RAN) showing an example relay node and its connections with an eNodeB and a user equipment unit (UE).

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware circuitry, e.g., digital or analog circuitry, including but not limited to application specific integrated circuit(s) (ASIC), and state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

FIG. 1 shows portions of a wireless communication system 20 wherein donor base-station (eNodeB) 28 communicates with wireless terminal or user equipment (UE) 30 through a relay node (RN) 34. As further shown in FIG. 1, relay node 34 communicates with the wireless terminal (UE) 30 on the Uu link or interface and with the donor base-station on the Un link or interface. The Uu link or interface is also known as the access link and the Un link or interface is also known as the backhaul link. The downlink (DL) frequency is denoted $f_{DL}$ and the uplink (UL) frequency is denoted $f_{UL}$.

Figure 2:
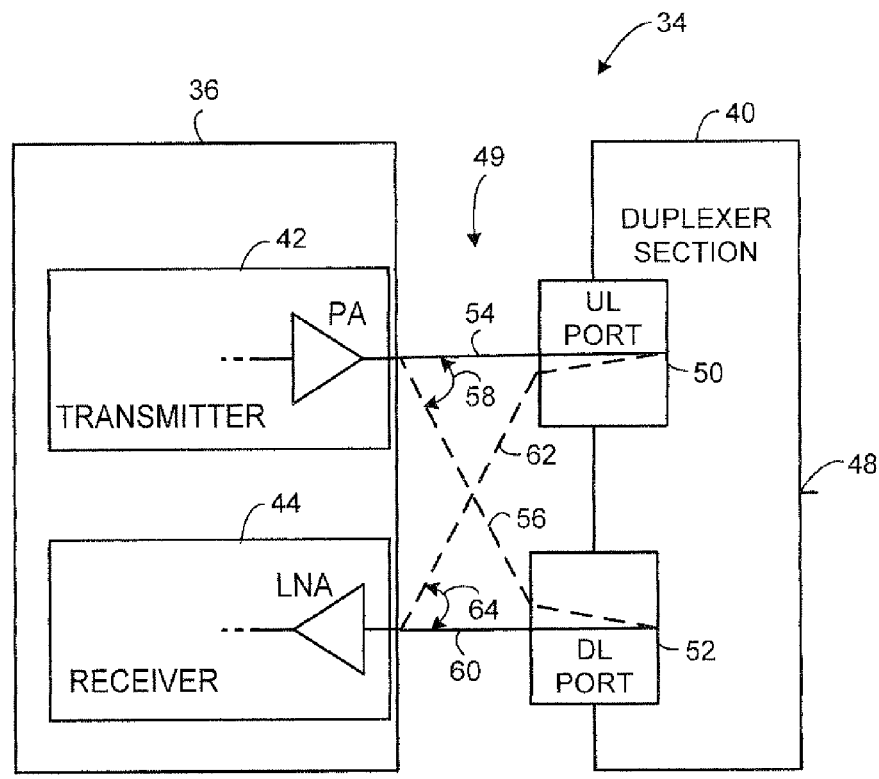
FIG. 2 is a schematic view of a portion of an example embodiment of a relay node.

FIG. 2 shows an example embodiment of a portion, e.g., front end portion, of relay node 34 which is generic to other embodiments described herein. As mentioned above, the relay node 34 wirelessly communicates on a backhaul link over a first interface, the Un interface, with a base station node of a radio access technology network, e.g., base station 28, and wirelessly communicates on an access link over a second interface, the Uu interface, with wireless terminal 30. As further shown in FIG. 2, relay node 34 comprises transceiver 36 and duplexer section 40. The transceiver 36 in turn comprises transmitter 42 and receiver 44. In the illustrated embodiment, transceiver 36 comprises a sole transmitter 42 and a sole receiver 44. The transmitter 42 comprises power amplifier (PA); the receiver 44 comprises a low noise amplifier (LNA).

Duplexer section 40 comprises plural transceiver ports and at least one antenna port 48. The transceiver ports of duplexer section 40 comprise uplink (UL) transceiver port 50 and downlink (DL) transceiver port 52. It will be appreciated that when operating over the Un interface with base station 28 a transmission from relay node 34 occurs on the uplink (UL) while a transmission from base station 28 is received on the downlink (DL). The transmission from relay node 34 is also known as a backhaul link portion of a transmit signal, and in occurring on the uplink (UL) also occurs through uplink (UL) transceiver port 50. The transmission from base station 28, being received on the downlink (DL), is received through downlink (DL) transceiver port 52. Conversely, when operating over the Uu interface with wireless terminal 30 a transmission from relay node 34 occurs on the downlink (DL) and hence through downlink (DL) transceiver port 52, while a transmission from wireless terminal 30 is received on the uplink (UL), and hence through uplink (UL) transceiver port 50. The transmission from relay node 34 is also known as an access link portion of a transmit signal. Thus, the nomenclature of the uplink (UL) transceiver port 50 and downlink (DL) transceiver port 52, e.g., either uplink (UL) or downlink (DL), is derived in terms of the position of relay node 34 relative to the other party of the transmission, e.g., either base station 28 or wireless terminal 30.

It may be desired for relay nodes to take different forms depending on power requirements, location, and other considerations. Accordingly, different embodiments of relay nodes are described herein which are configured to provide a transmit signal from the transmitter 42 in a manner so that a backhaul link portion of the transmit signal is conveyed through a different transceiver port of the duplexer section 40 than is an access link portion of the transmit signal. In some example embodiments the transceiver 36 is connected to the duplexer section 40 so that the backhaul link portion of the transmit signal and the access link portion of the transmit signal are alternatingly applied to the different transceiver ports 50, 52 of the duplexer section 40 for respective alternating transmission on first interface, e.g., Un interface, and the second interface, e.g., Uu interface. In other example embodiments the duplexer section 40 is configured so that a transmit signal is applied to transceiver ports 50, 52 of the duplexer section, but whereby in alternating fashion a first of the transceiver ports, e.g., uplink (UL) transceiver port 50, conveys the backhaul link portion of the transmit signal and a second of the transceiver ports, e.g., transceiver port 52, conveys the access link portion of the transmit signal, so that the portions of the transmit signal are alternatingly transmitted on first interface, e.g., Un interface. and the second interface, e.g., Uu interface.

FIG. 2 illustrates alternating connection and/or alternating conveyance of a signal. For example, FIG. 2 illustrates by solid line 54 a backhaul link portion of a transmit signal which is conveyed through uplink (UL) transceiver port 50. FIG. 2 illustrates by broken line 56 an access link portion of a transmit signal which is conveyed through downlink (DL) transceiver port 52. FIG. 2 further illustrates by arrow 58 that the backhaul link and access link portions of the transmit signal emitted by transmitter 42 alternates in conveyance through uplink (UL) transceiver port 50 and downlink (DL) transceiver port 52. As indicated above, the alternating conveyance of the backhaul link and access link portions of the transmit signal may be at least partially due to manner of connection of the duplexer section 40, e.g., as by differing forms of connection means 49 such as one or more switching networks as illustrated in the embodiments of FIG. 5-FIG. 9. Alternatively the alternating conveyance of the backhaul link and access link portions of the transmit signal may be at least partially due to configuration of the duplexer section 40, as in the embodiment of FIG. 10, for example. Similarly and due to essentially the same considerations, FIG. 2 illustrates by solid line 60 a downlink (DL) receive signal which is conveyed through downlink (DL) transceiver port 52 and illustrates by broken line 62 an uplink (UL) receive signal which is conveyed through uplink (UL) transceiver port 50. FIG. 2 further illustrates by arrow 64 that the receive signal received by receiver 44 alternates in its conveyance through uplink (UL) transceiver port 50 and downlink (DL) transceiver port 52.

Figure 3:
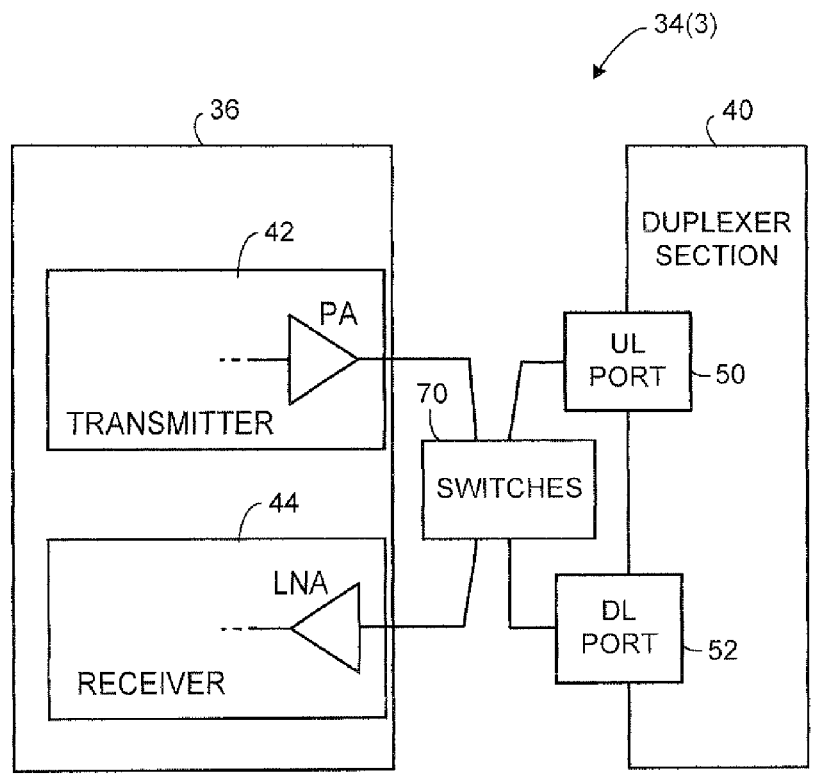
FIG. 3 is a schematic view of a portion of an example embodiment of a relay node which comprises a set of switches.
Figure 4:
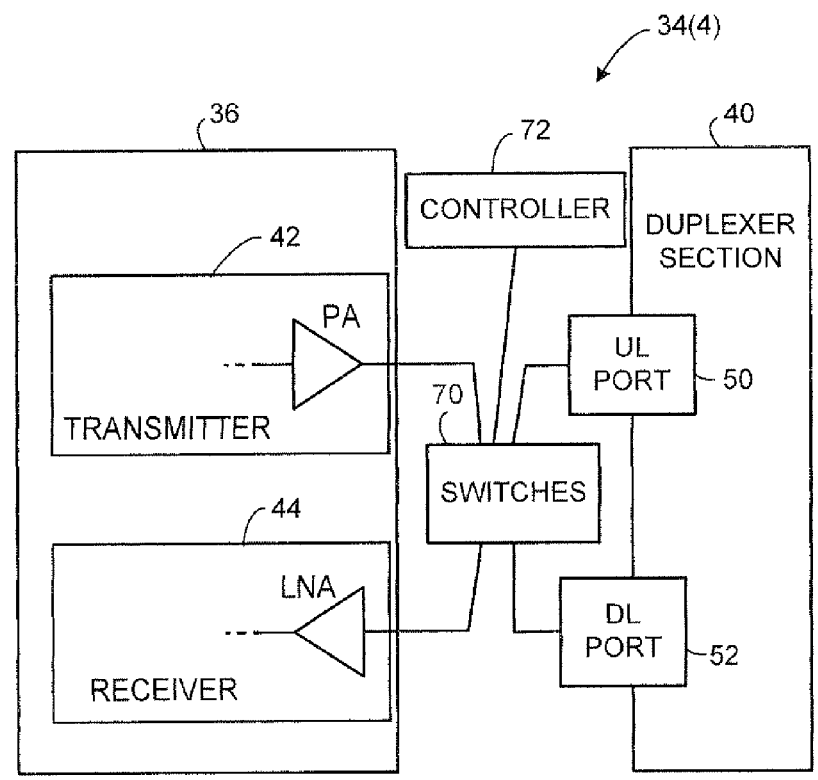
FIG. 4 is a schematic view of a portion of an example embodiment of a relay node which comprises a controller which controls a set of switches.

FIG. 3 generically illustrates an example embodiment of relay node 34(3) which further comprises a set of switches 70 through which the transmitter and the receiver swap transceiver ports to the duplexer. The set of switches 70 are included in or comprise the connecting means between transceiver 36 and duplexer section 40. As further illustrated by FIG. 4, the set of switches 70 can be operatively connected to and controlled by controller 72.

Figure 5:
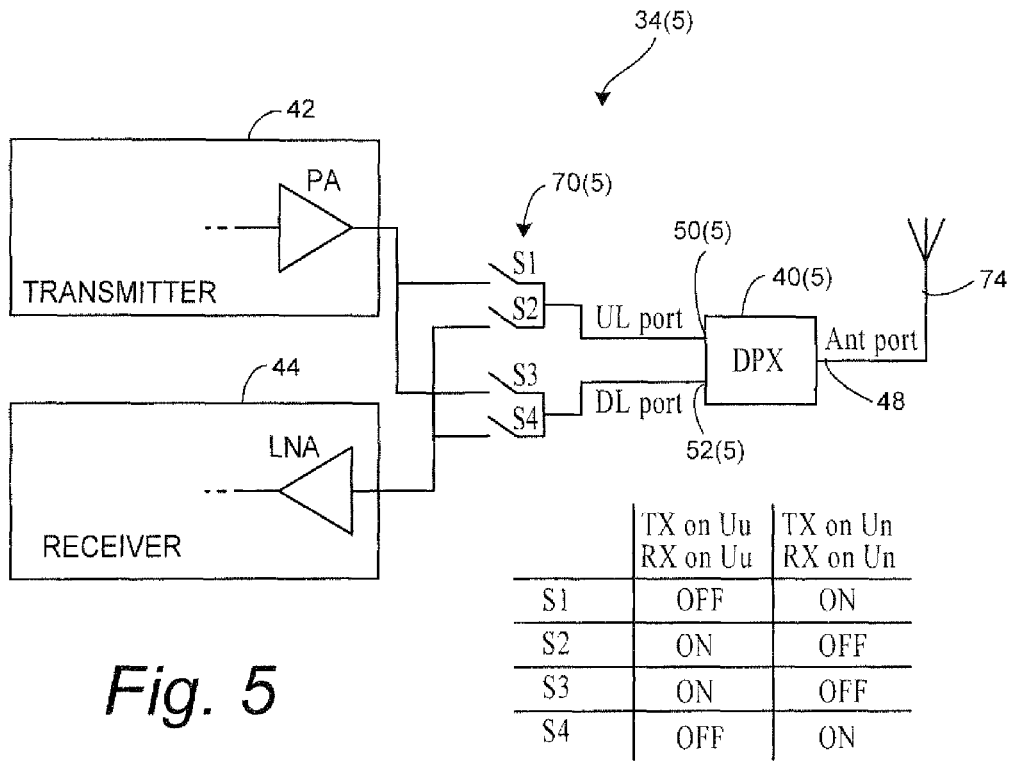
FIG. 5 is a schematic view of a portion of an example embodiment of a relay node which comprises a set of switches according to a particular example implementation.

FIG. 5 shows an example embodiment of relay node 34(5) wherein the duplexer section comprises a sole duplexer 40(5). Transceiver ports of the sole duplexer comprise a sole uplink (UL) port 50(5) and a sole downlink (DL) port 52(5). The relay node further comprises set of switches 70(5) through which the transmitter 42 and the receiver 44 are selectively connected to the transceiver ports (uplink (UL) transceiver port 50(5) and downlink (DL) transceiver port 52(5)) of the duplexer section 40(5). The antenna port 48 of duplexer section 40 is connected to sole antenna 74. Advantageously the uplink (UL) transceiver port 50(5) and downlink (DL) transceiver port 52(5) of the relay node 34(5) have a same power handling capability.

The set of switches 70(5) shown in FIG. 5 comprises a first pair of switches connected to the sole uplink (UL) port, e.g., uplink (UL) transceiver port 50(5), of the sole duplexer 40(5) and a second pair of switches connected to the sole downlink (DL) port, e.g., port 52(5) of the sole duplexer 40(5). A first switch (S1) of the first pair is also selectively connected to the transmitter 42; a second switch (S2) of the first pair is also selectively connected to the receiver 44; a first switch (S3) of the second pair is also selectively connected to the transmitter 42; and a second switch (S4) of the second pair is also selectively connected to the receiver 44.

FIG. 5 thus shows one embodiment of a relay node where one antenna is connected to only one duplexer. The duplexer has an UL port and a DL port, e.g., uplink (UL) transceiver port 50(5) and downlink (DL) transceiver port 52(5). A single receiver 44 and a single transmitter 42 are connected to the set of switches 70(5), comprising switches S1, S2, S3, and S4. The switches 70(5) enable the transmitter 42 and receiver 44 to swap transceiver ports to the duplexer 40. This and other embodiments described herein differ in implementation and solve problems associated with R1-101119, "Relay UL/DL timing discussion", 3GPP TSG RAN WG1 Meeting #60, San Francisco, USA, 22-26 Feb. 2010, while sharing the same general condition that the RN either operates with FDD towards the UE or the eNodeB.

In the example embodiment of FIG. 5 the set of switches 70(5) can be operated as described in Table 1. The set of switches 70(5) comprises switches S1, S2, S3, and S4.

TABLE 1

|    | TX on Uu; RX on Uu | TX on Un; RX on Un |
|----|--------------------|--------------------|
| S1 | OFF                | ON                 |
| S2 | ON                 | OFF                |
| S3 | ON                 | OFF                |
| S4 | OFF                | ON                 |

As understood from Table 1, in the example implementation of FIG. 5 the first switch of the first pair, switch S1, is open when the transmitter 42 transmits on the second interface, the Uu interface, and the receiver 44 receives on the second interface, the Uu interface, but is closed when the transmitter 42 transmits on the first interface, the Un interface, and the receiver 44 receives on the first interface, the Un interface. The second switch of the first pair, e.g., switch S2, is closed when the transmitter 42 transmits on the second interface, the Uu interface, and the receiver 44 receives on the second interface, the Uu interface, but is open when the transmitter 42 transmits on the first interface, the Un interface, and receiver 44 receives on the first interface, the Un interface. The first switch of the second pair, e.g., switch S3, is closed when the transmitter 42 transmits on the second interface, the Uu interface, and the receiver 44 receives on the second interface, the Uu interface, but is open when the transmitter 42 transmits on the first interface, the Un interface, and the receiver 44 receives on the first interface, the Un interface. The second switch of the second pair, e.g., switch S4, is open when the transmitter 42 transmits on the second interface and the receiver 44 receives on the second interface, the Uu interface, but is closed when the transmitter 42 transmits on the first interface, the Un interface, and the receiver 44 receives on the first interface, the Un interface. Thus, the technology disclosed herein includes, e.g., a method of operating the relay node in the manner reflected, e.g., by Table 1, wherein the transmitter and the receiver swap transceiver ports to/of the duplexer.

Figure 6:
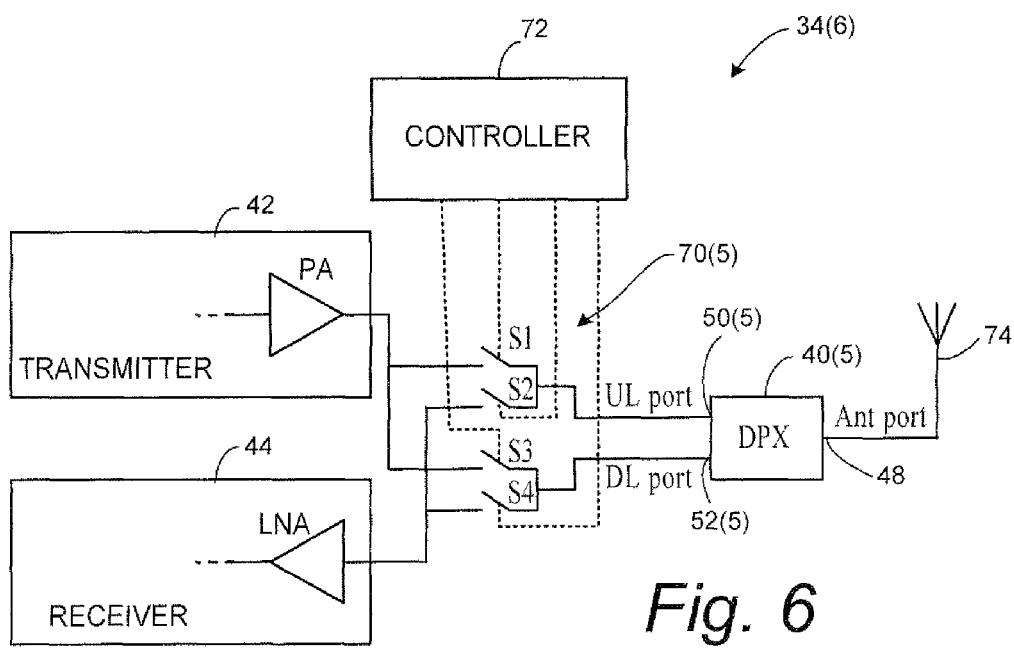
FIG. 6 is a schematic view of the relay node and further comprising a controller which controls the set of switches according to the FIG. 5 implementation.

FIG. 6 shows an embodiment of portions of a relay node 34(6) including the one duplexer 40(5), the set of switches 70(5), the transmitter 42, and the receiver 44 as shown in FIG. 5, but further comprising a processor or controller 72 which is connected to govern operation of the switches of the set of switches 70(5). The processor or controller 72 can be computer-implemented or implemented as a hardware device, as explained herein.

Figure 7:
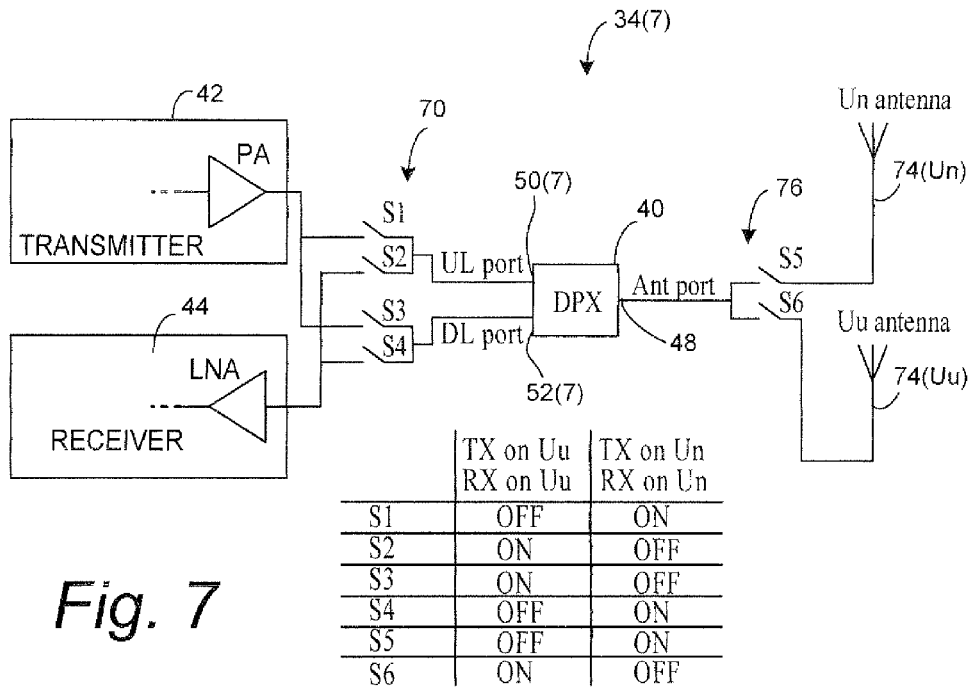
FIG. 7 is a schematic view of a portion of an example embodiment of a relay node which comprises a sole duplexer to support separate backhaul link and access link antennas.

FIG. 7 shows a variation of the embodiment of FIG. 5 and FIG. 6 wherein relay node 34(7) further comprises backhaul link antenna (also known as Un antenna) 74(Un); access link antenna, also known as the Uu antenna 74(Uu); and, antenna port switch 76. A sole antenna port 48 of the sole duplexer 40(5) is selectively connected by the antenna port switch 76 to the backhaul link antenna 74(Un) and to the access link antenna 74(Uu). As shown in FIG. 7 the antenna port switch 76 comprises switches, also known as switch contacts, S5 and S6. Operation of the switches of the relay node 34(7) of FIG. 7 are understood with reference to Table 2.

TABLE 2

|    | TX on Uu; RX on Uu | TX on Un; RX on Un |
|----|--------------------|--------------------|
| S1 | OFF                | ON                 |
| S2 | ON                 | OFF                |

TABLE 2-continued

| | TX on Uu; RX on Uu | TX on Un; RX on Un |
|---|---|---|
| S3 | ON | OFF |
| S4 | OFF | ON |
| S5 | OFF | ON |
| S6 | ON | OFF |

Thus, FIG. 7 illustrates how a relay node, such as relay node 34 (7), for example, may be designed to support separate antennas for the Uu and Un link, respectively. For example, the Un antenna 74(Un) can be placed outside a building to ensure a good Un link while the Uu antenna 74(Uu) is placed inside the building to support the UE inside that building without the penetration loss associated with the outer walls of the building. FIG. 7 thus shows how other embodiments can be altered to include an additional two switches which are used to pass signals to/from either the Un or the Uu antenna.

As understood from the foregoing, in some of its aspects the technology disclosed herein, and particularly the technology of the embodiments of FIG. 5, FIG. 6, and FIG. 7, concerns a relay radio architecture and method with low complexity incorporating only one duplexer, e.g., duplexer section 40(5), per Uu/Un antenna port pair. In contrast to a normal duplexer having different power handling capabilities for receiving (RX) and transmitting (TX) ports of a regular FDD-based transceiver, the sole duplexer 40(5) and the operation of method thereof are designed to provide power handling capabilities according to the maximum transmitter output levels for the access and backhaul links, respectively. In other words, whereas an ordinary FDD transceiver is based on a duplexer that has different power handling capabilities of the TX and RX ports the technology disclosed herein is based on the fact that the duplexer is designed to have the same power handling capabilities of both the UL and DL ports.

Use of switching networks such as the set of switches 70 can facilitate implementation of a relay node, sometimes with some penalty in isolation and/or insertion loss. However, the person skilled in the art will know to use and implement a set of switches which provide isolation at least as good as the duplexer section 40. The isolation can be achieved in circuit fabrication, for example, in dependence upon such factors as distance between components, circuit integration techniques, and the like. Further, it should be realized that in some embodiments one switch can include or contain several channels or stages.

If the required transmit output power is different for UL and DL the duplexer should be designed optimally corresponding to this difference.

Other embodiments described herein may employ plural, e.g., two, duplexers rather than a sole duplexer. The example relay node 34(8) of the embodiment of FIG. 8 comprises transceiver 36 and a duplexer section that comprises backhaul link duplexer 40(Un) and access link duplexer 40(Uu). The transceiver ports of duplexer section 40(Un) comprise an uplink (UL) frequency transmit port and a downlink (DL) frequency receive port 52, the access link duplexer 40(Uu) comprises a downlink (DL) frequency transmit port 50 and an uplink (UL) receive port. The relay node 34(8) comprises a sole antenna 74 and antenna port switch 76. An antenna port of the backhaul link duplexer 40(Un) and an antenna port of the access link duplexer 40(Uu) are selectively connected to the sole antenna 74 of the relay node 34(8) through the antenna port switch 76.

Figure 8:
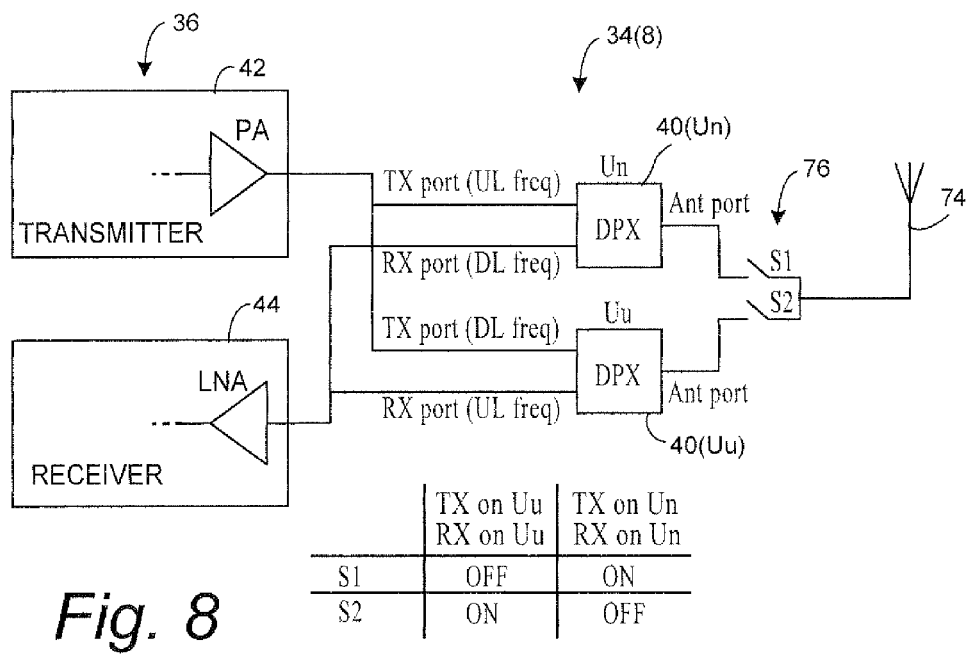
FIG. 8 is a schematic view of a portion of an example embodiment of a relay node which comprises two duplexers and a switching network at antenna port.

The antenna port switch 76 of FIG. 8 comprises switch S1 and switch S2. As understood from Table 3, the switch S1 of antenna port switch 76 is open (OFF) and the switch S2 of antenna port switch 76 is closed (ON) when the relay node 34(8) transmits and receives over the Uu interface, e.g., transmits to and receives from wireless terminal 30. On the other hand, switch S1 of antenna port switch 76 is closed (ON) and the switch S2 of antenna port switch 76 is open (OFF) when the relay node 34(8) transmits and receives over the Un interface, e.g., transmits to and receives from base station 28.

TABLE 3

| | TX on Uu; RX on Uu | TX on Un; RX on Un |
|---|---|---|
| S1 | OFF | ON |
| S2 | ON | OFF |

The relay node 34(8) of the embodiment of FIG. 8 is thus based on two duplexers, e.g., backhaul link duplexer 40(Un) and access link duplexer 40(Uu), instead of one. Employment of two duplexers enables the switching network, e.g., network 76, to be placed at the antenna port of the two duplexers. Furthermore, only two switches are required for antenna port switch 76 rather than the four switches of set of switches 70(5) of the embodiment of FIG. 5. The embodiment of FIG. 8 allows the use of duplexers having unequal power handling capabilities at transmit and receive ports, respectively. That is, the transmit ports of the duplexers, e.g., the transmit port of both backhaul link duplexer 40(Un) and the transmit port 50(Uu) of access link duplexer 40(Uu), are tied together, and so are the two receive ports, e.g., the receive port 52(Un) and the receive port 52(Uu). This is feasible if the ports tied together are co-designed in a fashion similar to a regular duplexer where the transmit filter part output and receive filter part input are tied together. While twice as many duplexers are required compared to the embodiment of FIG. 5, the embodiment of FIG. 8 has the advantage of having the switching network on the antenna side of the duplexer section 40, e.g., of the backhaul link duplexer 40(Un) and the access link duplexer 40(Uu). This is advantageous because the switching network in the embodiment of FIG. 5 must be designed to have at least as high isolation as the duplexer 40(5), but there are no such demanding requirements on the switching network, e.g., antenna port switch 76, of the embodiment of FIG. 8.

Figure 9:
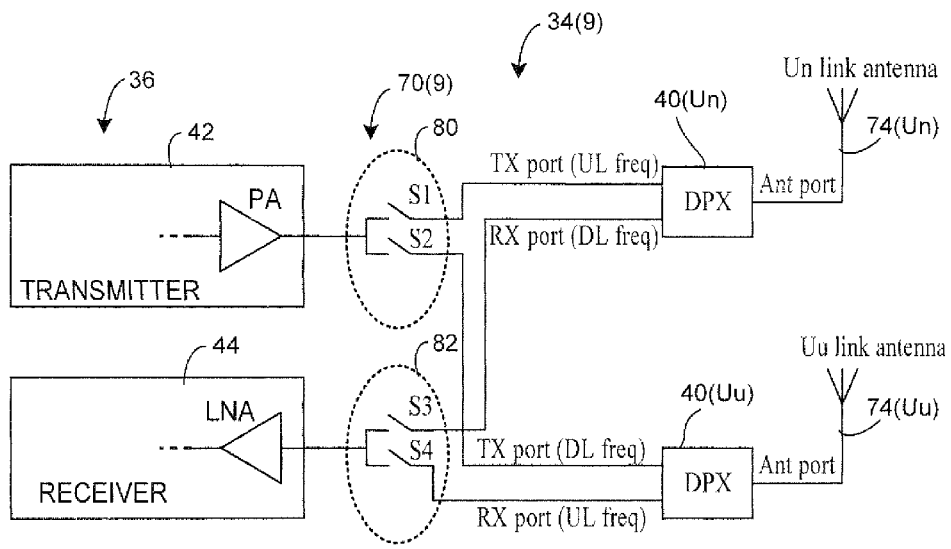
FIG. 9 is a schematic view of a portion of an example embodiment of a relay node which comprises two duplexers to support separate backhaul link and access link antennas.

The example embodiment relay node 34(9) of FIG. 9 comprises backhaul link antenna 74(Un); access link antenna 74(Uu); and a set of switches 70(9) connected between the duplexer section and the transceiver 36. The duplexer section of FIG. 9 comprises backhaul link duplexer 40(Un) and access link duplexer 40(Uu). The transceiver ports of duplexer section 40(Un) comprise an uplink (UL) frequency transmit port and a downlink (DL) frequency receive port 52, the access link duplexer 40(Uu) comprises a downlink (DL) frequency transmit port 50 and an uplink (UL) receive port. The set of switches 70(9) comprises transmitter switch 80 and receiver switch 82. The transmitter switch 80 is selectively connected to a transmit port of backhaul link duplexer 40(Un) and to a transmit port of access link duplexer 40(Uu). The receiver switch 82 is selectively connected to a receive port of backhaul link duplexer 40(Un) and to a receive port of access link duplexer 40(Uu). As with the FIG. 8 embodiment, the duplexers of FIG. 9, e.g., backhaul link duplexer 40(Un) and access link duplexer 40(Uu), do not have to be designed with receive and transmit ports having the same power handling capabilties.

Figure 10:
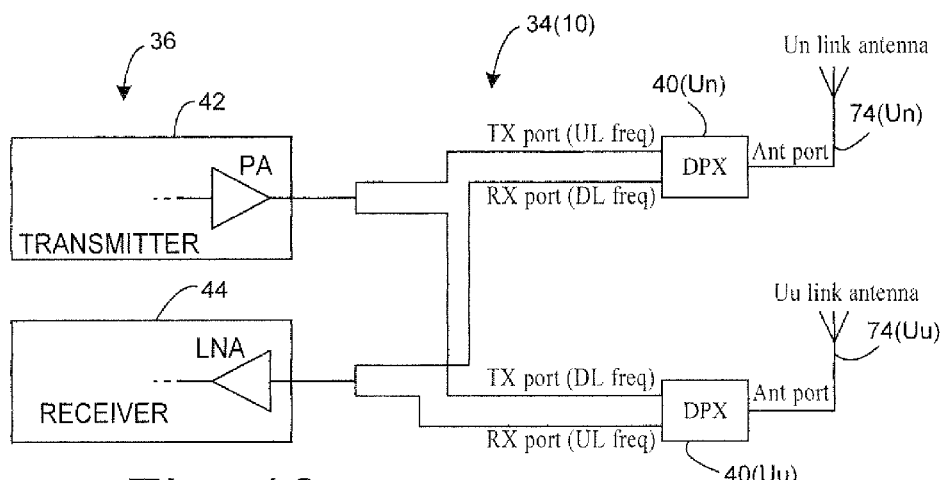
FIG. 10 is a schematic view of a portion of an example embodiment of a relay node which comprises two duplexers to support separate backhaul link and access link antennas without a switching network.

FIG. 10 shows an example embodiment relay node 34(10) also comprising a backhaul link antenna 74(Un) and an access link antenna 74(Uu). Like the FIG. 9 embodiment, the duplexer section of the FIG. 10 embodiment comprises backhaul link duplexer 40(Un) and access link duplexer 40(Uu). The transceiver ports of duplexer section 40(Un) comprise an uplink (UL) frequency transmit port and a downlink (DL) frequency receive port 52, the access link duplexer 40(Uu) comprises a downlink (DL) frequency transmit port 50 and an uplink (UL) receive port. In the FIG. 9 embodiment transmitter 42 is connected to apply a transmit signal to both a transmit port of backhaul link duplexer 40(Un) and a transmit port of access link duplexer 40(Uu). The receiver 44 is connected to both a receive port of backhaul link duplexer 40(Un) and a receive port of access link duplexer 40(Uu). The embodiment of FIG. 10 is similar to that in FIG. 9 but without the switches. In the architecture of FIG. 10 the duplexer ports that are connected together are codesigned as discussed above.

The backhaul link duplexer 40(Un) and the access link duplexer 40(Uu) of the embodiment of FIG. 10 are configured to convey a signal only if the signal is appropriate to the respective link. In an example implementation, the backhaul link duplexer 40(Un) and the access link duplexer 40(Uu) are configured to convey a signal only if the signal is frequency appropriate to the respective link. For example, if the transmitter 42 issues a transmit signal having the uplink (UL) transmit frequency suitable for the Un link, only the uplink (UL) transceiver port will convey the transmit signal through its respective duplexer, e.g., the transmit signal is conveyed through backhaul link duplexer 40(Un) but not through access link duplexer 40(Uu). Similarly, if the transmitter 42 issues a transmit signal having the downlink (DL) transmit frequency suitable for the Uu link, only the downlink (DL) transceiver port of access link duplexer 40(Uu) will convey the transmit signal through its respective duplexer, e.g., the transmit signal is conveyed through access link duplexer 40(Uu) but not through backhaul link duplexer 40(Un). In the receive operation, only the backhaul link duplexer 40(Un) conveys to receiver 44 a received signal having the downlink (DL) frequency, and only the access link duplexer 40(Uu) conveys to receiver 44 a received signal having the uplink (UL) frequency.

Figure 11:
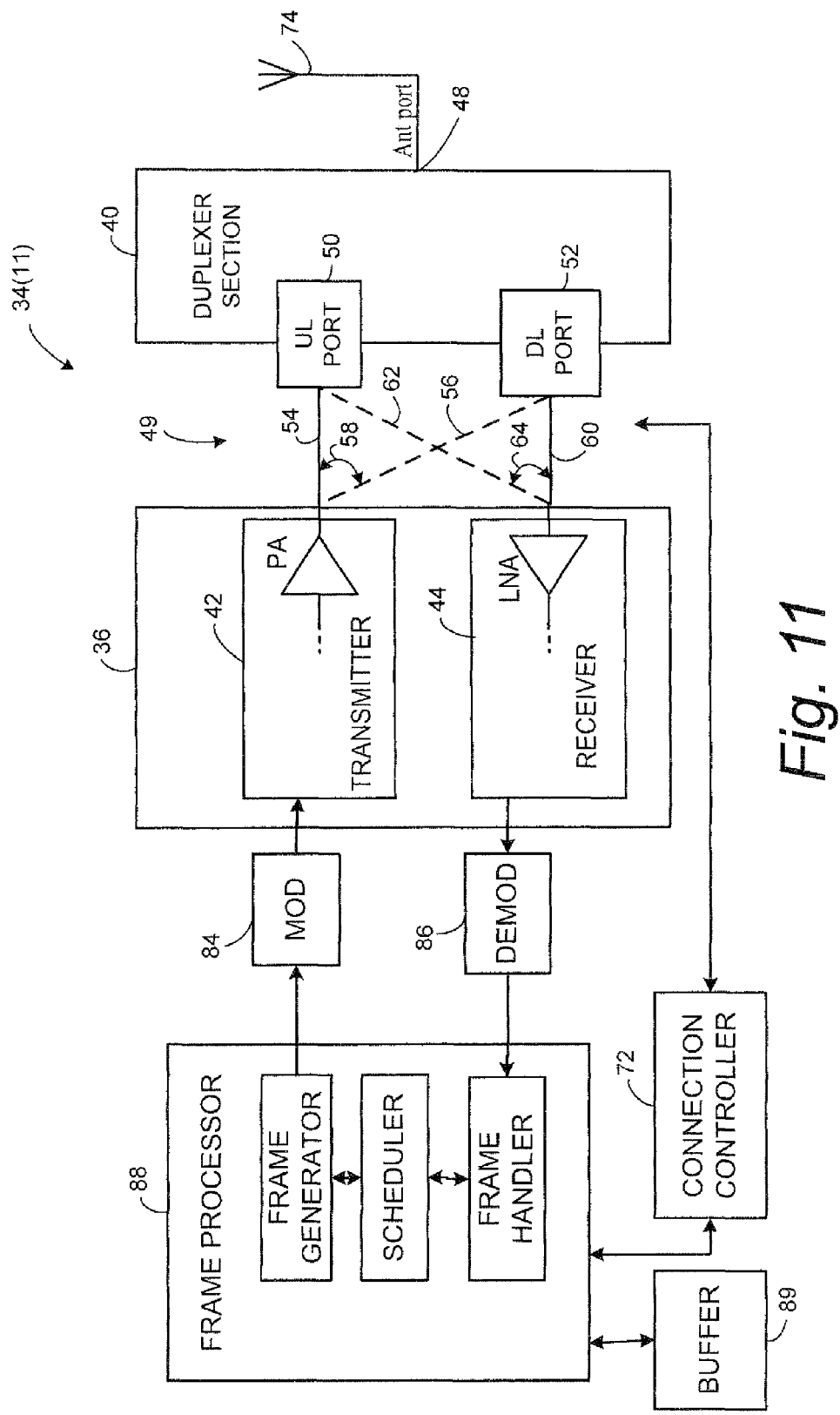
FIG. 11 is a schematic view of a portion of another example embodiment of a relay node showing other portions of the relay node in addition to a relay node front-end.

FIG. 11 illustrates example contextualization of a relay node front end and controller in an overall relay node 34(11). The example contextualization provided by FIG. 11 is applicable to all embodiments described herein or embraced hereby. The relay node further comprises a modulator 84 connected to the transmitter 42; a demodulator 86 connected to the receiver 44; and frame processor 88. The frame processor 88 is configured to generate frames to be transmitted over the first interface, e.g., the Un interface, and the second interface, e.g., the Uu interface, from the relay node 34(11) and to process frames received by the relay node 34(11) over the first interface and the second interface. A buffer 89 is provided to store information prior to being formatted into frames by frame processor 88, as well as information deformatted from frames for use by application programs and the like.

It will be appreciated that previously discussed figures primarily illustrate selected elements or units of front end portions of an example relay node, and that the front end as well as the remainder of the relay node typically includes other functionalities and units which, for sake of simplicity, are not previously illustrated. For example, a relay front end generally includes not only the power amplifier (PA) and low noise amplifier (LNA) associated with the transmitter and receiver, respectively, but also modulators, demodulators, encoders, decoders, frame formatters/deformatters, buffers, signal handlers, filters, phase shifters, and one or more controllers or processors which govern or coordinate operation of the relay node and these and other functionalities and units.

Figure 12:
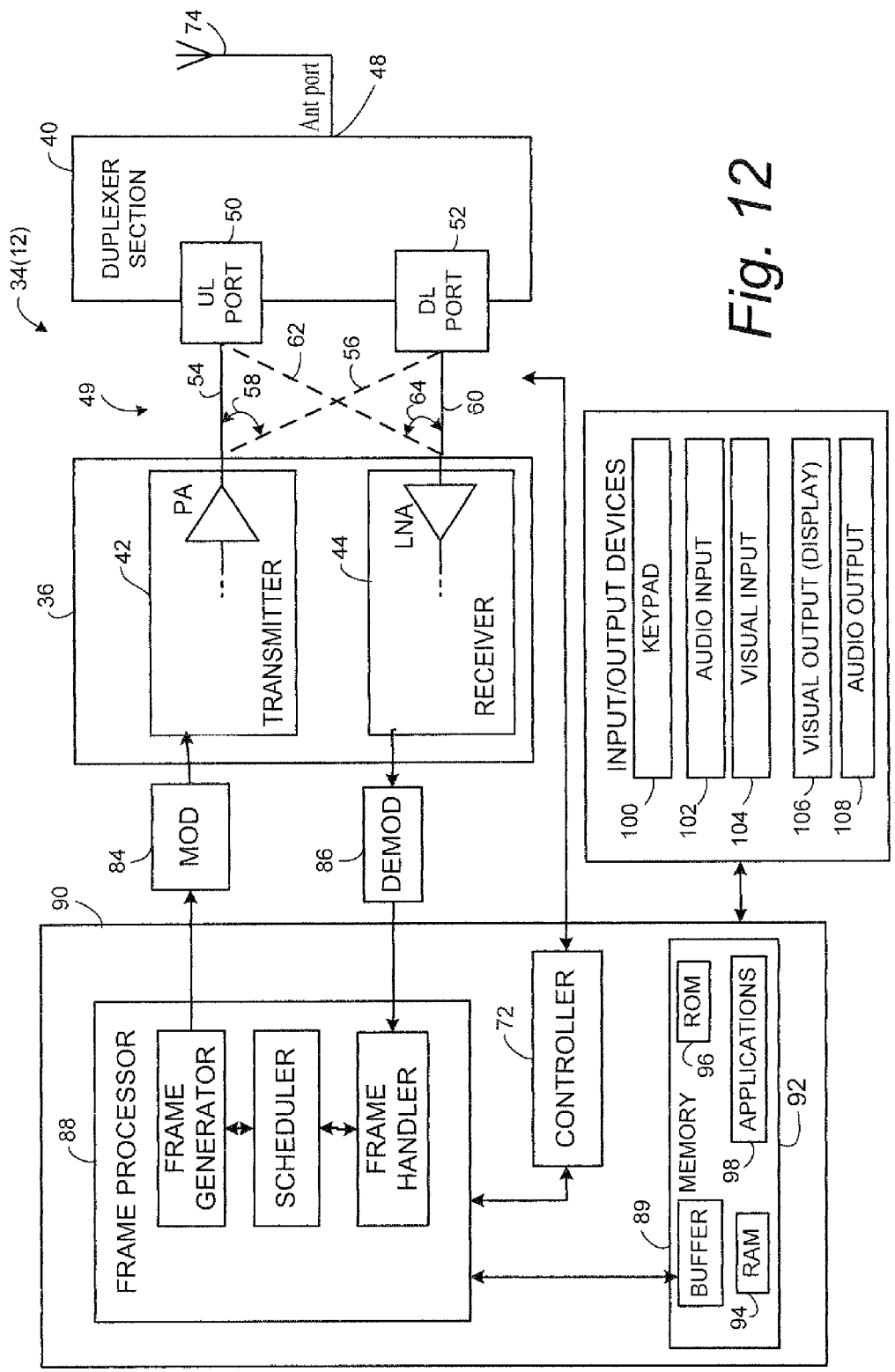
FIG. 12 is a more detailed schematic view of an example embodiment of a relay node showing a platform implementation.

FIG. 12 further shows that certain functionalities of an example embodiment relay node 34(12), which can be representative and applicable to other embodiments described herein, can be realized by and/or provided on a platform 90. The terminology "platform" is a way of describing how the functional units of a communications unit or node can be implemented or realized by machine. One example platform is a computer implementation wherein one or more of the elements framed by line 90, including but not limited to frame processor 88 and controller 72, is implemented by a computer or processor or controller.

In one example implementation, the functionalities shown as framed by platform 90 and even other functionalities can be realized by one or more processors which execute coded instructions stored in memory, e.g., non-transitory signals, in order to perform the various acts described herein. In such a computer implementation the wireless terminal can comprise, in addition to a processor(s), a memory section 92. The memory section 92 in turn can comprise random access memory 94; read only memory 96; application memory 98 which stores, e.g., coded instructions which can be executed by the processor to perform acts described herein; and any other memory such as cache memory, for example.

Whether or not specifically illustrated, typically the relay node of each of the embodiments discussed herein can also comprise certain input/output units or functionalities, the representative input/output units for wireless terminal being illustrated in FIG. 12 as keypad 100; audio input device, e.g. microphone 102; visual input device, e.g., camera 104; visual output device, e.g., display 106; and audio output device, e.g., speaker 108. Other types of input/output devices can also be connected to or comprise relay node.

In the example of FIG. 12 the platform 90 has been illustrated as computer-implemented or computer-based platform. Another example platform 90 for relay node RN can be that of a hardware circuit, e.g., an application specific integrated circuit (ASIC) wherein circuit elements are structured and operated to perform the various acts described herein.

Although the description above contains many specificities, these should not be construed as limiting the scope of the technology disclosed herein but as merely providing illustrations of some of the presently preferred embodiments. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A relay node which wirelessly communicates on a backhaul link over a first interface with a base station node of a radio access technology network and which wirelessly communicates on an access link over a second interface with a wireless terminal, the relay node comprising:
    a transceiver comprising a transmitter and a receiver and an amplifier;
    a duplexer section comprising plural transceiver ports;
    a set of plural switches through which the transmitter and the receiver are selectively connected to the transceiver ports of the duplexer section, the set of plural switches being external to the duplexer section and connected between the duplexer section and the amplifier of the transceiver;
    wherein the relay node is configured to provide a transmit signal from the transmitter in a manner whereby a backhaul link portion of the transmit signal is conveyed through a different transceiver port of the duplexer section than is an access link portion of the transmit signal.

2. The apparatus of claim 1, wherein the transmitter and the receiver swap transceiver ports to the duplexer section through the set of plural switches.

3. The apparatus of claim 2, further comprising means for selectively operating the plural switches of the set of plural switches.

4. The apparatus of claim 1, wherein the duplexer section comprises a sole duplexer, and wherein the transceiver ports of the sole duplexer comprise a sole uplink (UL) port and a sole downlink (DL) port, and wherein the relay node further comprises the set of plural switches through which the transmitter and the receiver are selectively connected to the transceiver ports of the duplexer section.

5. The apparatus of claim 4, further comprising means for selectively operating the plural switches of the set of plural switches.

6. The apparatus of claim 4, wherein the uplink (UL) port and the downlink (DL) port of the relay node have a same power handling capability.

7. The apparatus of claim 1, further comprising:
    a backhaul link antenna;
    an access link antenna;
    wherein the duplexer section comprises a backhaul link duplexer and an access link duplexer;
    wherein the set of switches comprises:
        a transmitter switch selectively connected to a transmit port of the backhaul link duplexer and to a transmit port of the access link duplexer;
        a receiver switch selectively connected to a receive port of the backhaul link duplexer and to a receive port of the access link duplexer.

8. The apparatus of claim 1, further comprising:
    a modulator connected to the transmitter;
    a demodulator connected to the receiver;
    a frame processor configured to generate frames to be transmitted over the first interface and the second interface from the relay node and to process frames received by the relay node over the first interface and the second interface.

9. The apparatus of claim 1, wherein the transmitter of the transceiver comprises a power amplifier and the receiver of the transceiver comprises a low noise amplifier, and wherein the set of switches is connected between the duplexer section and between the power the amplifier of the transmitter and the low noise amplifier of the receiver.

10. The apparatus of claim 1, further comprising a sole duplexer in the duplexer section and a sole antenna connected to the sole duplexer.

11. A relay node which wirelessly communicates on a backhaul link over a first interface with a base station node of a radio access technology network and which wirelessly communicates on an access link over a second interface with a wireless terminal, the relay node comprising:
    a transceiver comprising a transmitter and a receiver;
    a duplexer section comprising plural transceiver ports;
    a set of plural switches through which the transmitter and the receiver are selectively connected to the transceiver ports of the duplexer section;
    wherein the relay node is configured to provide a transmit signal from the transmitter in a manner whereby a backhaul link portion of the transmit signal is conveyed through a different transceiver port of the duplexer section than is an access link portion of the transmit signal;
    wherein the set of plural switches comprises a first pair of switches connected to the sole uplink (UL) port of the sole duplexer and a second pair of switches connected to the sole downlink (DL) port of the sole duplexer;
    wherein a first switch of the first pair is also selectively connected to the transmitter;
    wherein a second switch of the first pair is also selectively connected to the receiver;
    wherein a first switch of the second pair is also selectively connected to the transmitter;
    wherein a second switch of the second pair is also selectively connected to the receiver;
    wherein the first switch of the first pair:
        is open when the transmitter transmits on the second interface and the receiver receives on the second interface;
        is closed when the transmitter transmits on the first interface and the receiver receives on the first interface;
    wherein the second switch of the first pair:
        is closed when the transmitter transmits on the second interface and the receiver receives on the second interface;
        is open when the transmitter transmits on the first interface and the receiver receives on the first interface;
    wherein the first switch of the second pair:
        is closed when the transmitter transmits on the second interface and the receiver receives on the second interface;
        is open when the transmitter transmits on the first interface and the receiver receives on the first interface;
    wherein the second switch of the second pair:
        is open when the transmitter transmits on the second interface and the receiver receives on the second interface;
        is closed when the transmitter transmits on the first interface and the receiver receives on the first interface.

12. A relay node which wirelessly communicates on a backhaul link over a first interface with a base station node of a radio access technology network and which wirelessly communicates on an access link over a second interface with a wireless terminal, the relay node comprising:
    a backhaul link antenna;
    an access link antenna which is distinct from the backhaul link antenna;
    a transceiver comprising a transmitter and a receiver;
    a duplexer section comprising a sole duplexer, the sole duplexer comprising plural transceiver ports;

an antenna port switch connected between (1) the sole duplexer and (2) both the backhaul link antenna and the access link antenna;

wherein the relay node is configured to provide a transmit signal from the transmitter in a manner whereby a backhaul link portion of the transmit signal is conveyed through a different transceiver port of the duplexer section than is an access link portion of the transmit signal;

wherein a sole antenna port of the sole duplexer is selectively connected by the antenna port switch to the backhaul link antenna and to the access link antenna.

13. The apparatus of claim 12, wherein the transceiver comprises an amplifier, and wherein the relay node further comprises a set of plural switches through which the transmitter and the receiver are selectively connected to the transceiver ports of the duplexer section, the set of plural switches being external to the duplexer section and connected between the duplexer section and the amplifier of the transceiver.

14. A relay node which wirelessly communicates on a backhaul link over a first interface with a base station node of a radio access technology network and which wirelessly communicates on an access link over a second interface with a wireless terminal, the relay node comprising:
   a sole antenna;
   a transceiver comprising a transmitter and a receiver;
   a duplexer section comprising a backhaul link duplexer and an access link duplexer;
   an antenna port switch which is external to the duplexer section;
   wherein the relay node is configured to provide a transmit signal from the transmitter in a manner whereby a backhaul link portion of the transmit signal is conveyed through a different transceiver port of the duplexer section than is an access link portion of the transmit signal;
   wherein the transmitter is connected to apply the transmit signal to both a transmit port of the backhaul link duplexer and a transmit port of the access link duplexer;
   wherein the receiver is connected to both a receive port of the backhaul link duplexer and a receive port of the access link duplexer; and
   wherein an antenna port of the backhaul link duplexer and an antenna port of the access link duplexer are selectively connected to the sole antenna of the relay node through the antenna port switch.

15. A relay node which wirelessly communicates on a backhaul link over a first interface with a base station node of a radio access technology network and which wirelessly communicates on an access link over a second interface with a wireless terminal, the relay node comprising:
   a transceiver comprising a transmitter and a receiver;
   a backhaul link antenna;
   an access link antenna;
   a duplexer section comprising a backhaul link duplexer and an access link duplexer;
   wherein a same power amplifier of the transmitter is connected to apply a transmit signal to both a transmit port of the backhaul link duplexer and a transmit port of the access link duplexer;
   wherein a same amplifier of the receiver is connected to both a receive port of the backhaul link duplexer and a receive port of the access link duplexer; and
   wherein the backhaul link duplexer and the access link duplexer are configured to convey a signal only if the signal is frequency appropriate to the respective link.

* * * * *

UNITED STATES PATENT AND TRADEMARK OFFICE
CERTIFICATE OF CORRECTION

PATENT NO. : 8,570,915 B2  
APPLICATION NO. : 12/817325  
DATED : October 29, 2013  
INVENTOR(S) : Sundstrom et al.

It is certified that error appears in the above-identified patent and that said Letters Patent is hereby corrected as shown below:

In the Specification

In Column 7, Line 48, delete "(51)" and insert -- (S1) --, therefor.

In Column 7, Line 62, delete "implemention" and insert -- implementation --, therefor.

Signed and Sealed this
Fifteenth Day of July, 2014

Michelle K. Lee
*Deputy Director of the United States Patent and Trademark Office*